Feb. 21, 1939  F. L. DARLING  2,148,190
HYDRAULIC BRAKE HOLDING APPARATUS
Filed Sept. 9, 1938  2 Sheets-Sheet 1
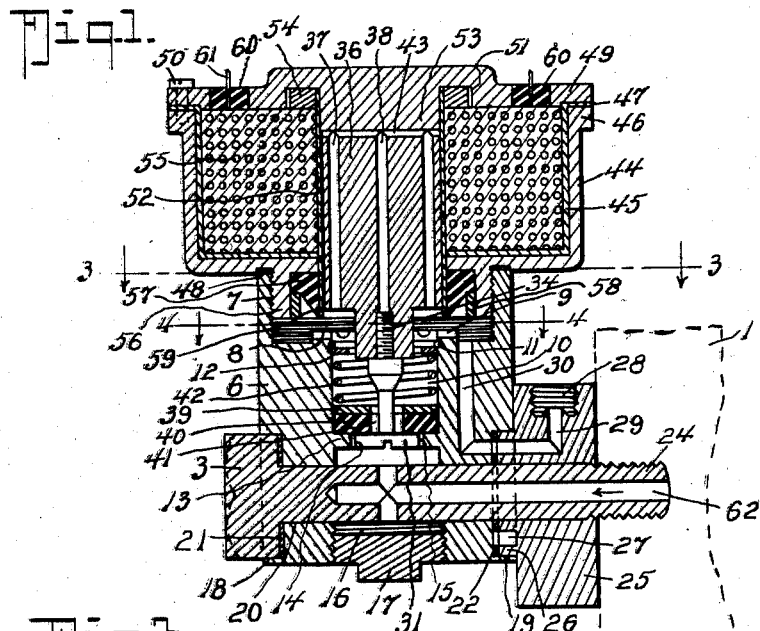
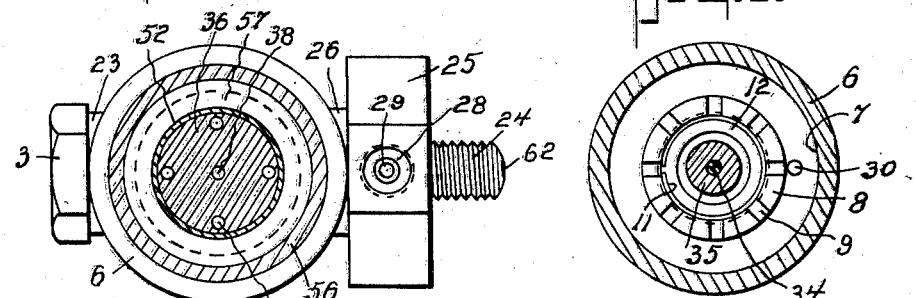
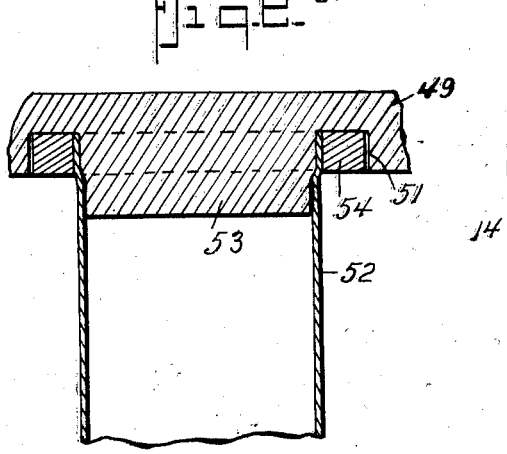
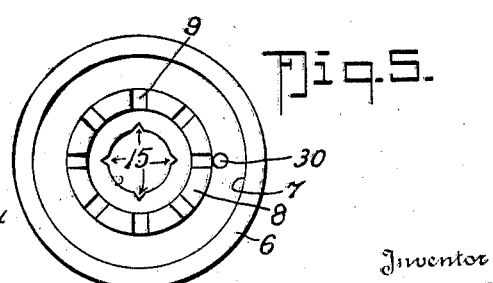
Inventor
FRANK L. DARLING
Albert E. Dieterich
and
Theodore H. Rutley
Attorneys Feb. 21, 1939.　　　　F. L. DARLING　　　　2,148,190
HYDRAULIC BRAKE HOLDING APPARATUS
Filed Sept. 9, 1938　　　2 Sheets-Sheet 2
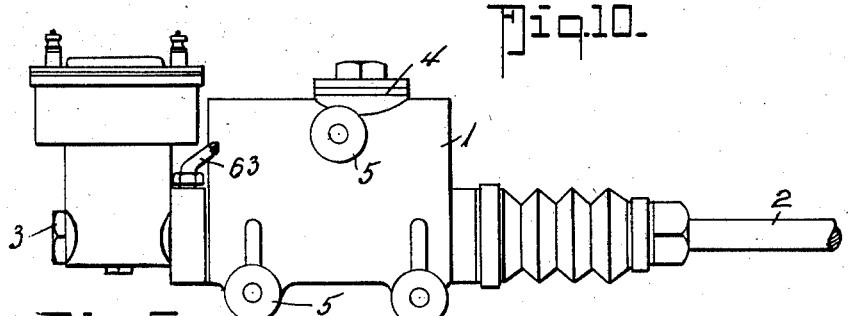
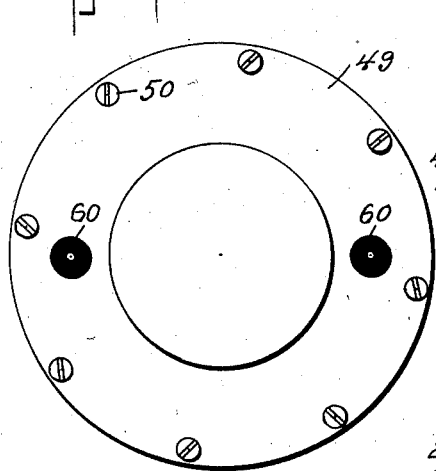
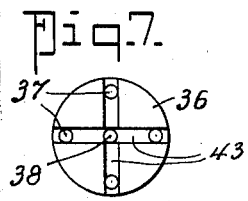
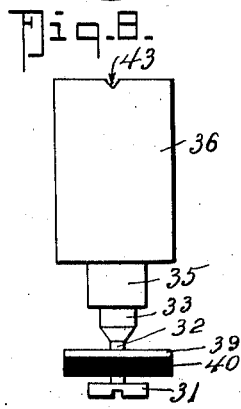
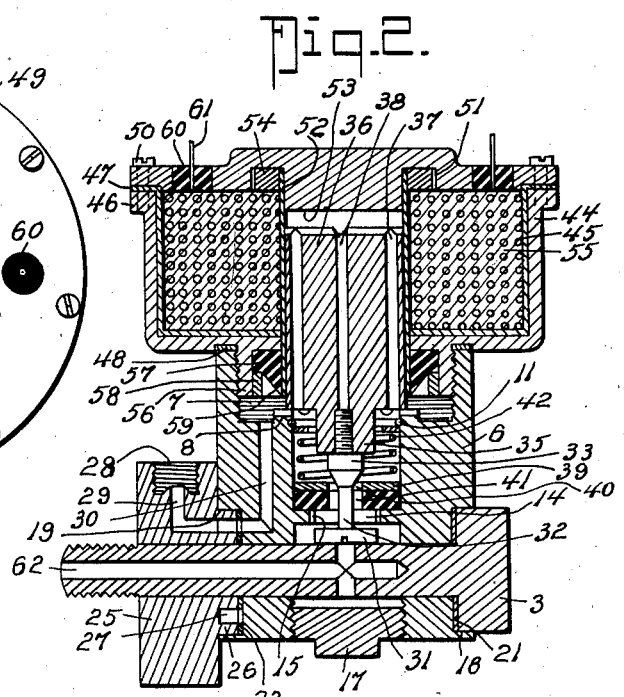
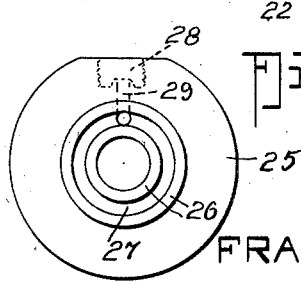
Inventor
FRANK L. DARLING
Albert E. Dieterich
and
By Theodore H. Rutley
Attorneys Patented Feb. 21, 1939

2,148,190

UNITED STATES PATENT OFFICE 2,148,190

HYDRAULIC BRAKE HOLDING APPARATUS

Frank L. Darling, New York, N. Y.

Application September 9, 1938, Serial No. 229,201

14 Claims. (Cl. 188—265)

REISSUED
OCT 2 2 1940

My invention relates particularly to motor vehicles having hydraulic brakes.

Drivers of automobiles generally have recognized the dangers and inconveniences of having to hold one's foot on the brake pedal while the vehicle has made a temporary stop, as for a traffic light. Especially is danger present if the vehicle has stopped while on its way up a hill for then when the driver wishes to start the machine rolling forwardly he must shift his foot from the brake pedal to the accelerator pedal and during the interval of shift the car is unbraked and usually begins to roll backwardly a greater or lesser distance, depending on the time required by the operator to shift his foot over from the brake pedal to the accelerator pedal. Some drivers when making short time stops frequently use the clutch as a brake to hold the car from rolling backward, while maintaining a foot also on the accelerator pedal for a quick get-away, with consequent unnecessary wear on the clutch, resulting in expensive relining or clutch replacement repairs.

Again, in going down long hills, the driver not infrequently gets tired of holding his foot in the brake-applying position.

It is therefore an object of the invention to provide a device of a simple, inexpensive, easily-operated character, which will eliminate all the foregoing objectionable features of present-day practice.

It has also been observed that with hydraulic brakes, a sudden application of foot power to the brake pedal often results in locking the brakes, with resultant shock to the occupants of the vehicle and sometimes causing serious injury due to the occupants of the vehicle being thrown forwardly by the sudden stop.

It is therefore a further object to combine with the brake holding feature of my invention, means to cushion the application of the brakes so as to reduce danger of locking to the minimum.

Further it is an object to improve the apparatus which comprises the subject matter of my application Ser. No. 204,902, filed April 28, 1938, so as to reduce the cost of manufacture.

Other objects will in part be obvious and in part be pointed out hereinafter.

To the attainment of the above objects and ends the invention still further resides in those novel features of construction, combination and arrangement of parts, all of which will be first fully described in the detailed description and then be particularly pointed out in the appended claims, reference being had to the accompanying drawings, in which:—

Fig. 1 is a central vertical longitudinal section of my apparatus, the parts being located in the position they assume when the magnet has been energized.

Fig. 2 is a like section with the parts in the normal or inactive position (magnet de-energized).

Fig. 3 is a section on the line 3—3 of Fig. 1.

Fig. 4 is a section on the line 4—4 of Fig. 1.

Fig. 5 is a plan view of the lower casting having the valve seat.

Fig. 6 is a top plan view of the apparatus.

Fig. 7 is a top plan view of the core.

Fig. 8 is a side elevation of the combined core and valve unit.

Fig. 9 is a magnified detail section showing how the non-magnetic guide sleeve is secured fluid-tight to the top of the casing.

Fig. 10 is a side elevation of a hydraulic brake-applying cylinder (Lockheed type) with my apparatus applied.

Fig. 11 is an elevation of the distributor.

In the drawings, in which like numerals of reference designate like parts in all the figures, I represents the usual brake-applying cylinder and oil reservoir, 2 the brake-applying rod which is operated by the usual pedal and return spring (not shown), 4 the filler cap and 5 the mounting lugs, all of which are of known construction and per se are not of my invention.

My invention comprises a lower cylinder 6 having a diametrical bore 20 recessed at the ends as at 18 and 19 and providing for the screw bolt 3. The cylindrical neck 23 of the bolt fits in recess 18 against a suitable washer 21 (copper, for instance). The bolt passes through the distributor 25 (which may be turned on the bolt with its cylindrical neck 26 held in recess 19 against a washer 22) into the brake-applying cylinder 1. When the bolt is tight, distributor 25 is held immovable.

The cylinder 6 has a recess in its upper end the wall of which is threaded at 7 to screw on the threaded ring 56 of the magnet case 44, later again referred to.

The cylinder 6 has a longitudinal passage 10 around the upper end of which is provided an annular portion 8 having cross grooves 9, the portion 8 constituting a core stop if desired.

Located in a groove in the wall of the passage 10 is a split spring-ring 11 which holds the spring stop washer or ring 12 against being forced out by the valve-seating spring (coil) 42 which engages the metallic washer 39 continually to urge the flexible and/or elastic (rubber, preferably) valve seat 40 toward the web 13.

The web has a bore 14 with by-pass grooves 15, into which bore the cylindrical plug-valve 31 has a sliding fit and when the magnet is energized this valve 31 engages valve seat 40, as will later be made clear.

The passage 10 below the bolt 3 is tapped and closed by a screw plug 17.

The bolt 3 has a threaded end 24 to screw into the cylinder 1.

The distributor 25 has a circular groove 27, a threaded socket 28 and a duct 29 connecting groove 27 to socket 28, while cylinder 6 has a duct 30 leading from groove 27 to recess 7.

The cylindrical plug valve 31 is formed on one end of a stem 32 which is threaded at 34 into the reduced end 35 of the core 36 and is formed with a stop shoulder 33. The core, of course, is formed of magnetic material, preferably mild steel, and it has through ducts 37 and a center bore 38, the ducts and bore being connected by cross grooves 43.

Mounted loosely on the stem 32 are the flexible and/or elastic disc valve seat 40 and the metal washer 39 whose holes 41 are large enough so the seat 40 and washer 39 can be passed over the shoulder 33 in assembling the core-valve unit (Fig. 8).

The magnet case is preferably formed of an outer die-cast shell 44 and an inner pressed steel shell or liner 45 having flanges 46 and 47 respectively with matched screw holes for the screws 50 that secure the cover 49 in place.

A suitable washer 48 sets in a groove in the outer shell 44, against which washer 48 the upper end of cylinder 6 is screwed tightly.

The cover 49 has an annular recess or groove 51 and a cylindrical lug 53 on which a thin brass or other non-magnetic sleeve 52 is forced tightly and held to the lug by means of a ring 54 which is shrunk on and lies in recess 51.

As best shown in Fig. 9, the lug 53 for the depth of the groove 51 is of slightly greater outside diameter than that of the inner diameter of the sleeve 52, while the lower part of the lug fits within the sleeve 52 with a free sliding fit. Thus, when sleeve 52 is forced over the larger part of 53 it will be slightly expanded. Then the ring 54 is heated to expand it and it is placed over sleeve 52 and into groove 54. On cooling, ring 54 shrinks tightly around 52. This makes a fluid-tight joint and rigidly secures sleeve 52 to cover 49. Sleeve 52 constitutes a guide in which core 36 moves freely up and down and rotationally if necessary.

The coil 55 of the magnet is wound as a unit and placed in the case 44—45 and its ends 61 are threaded through rubber insulating plugs 60, after which the cover is screwed on. Then the rubber seal 57 is placed in the ring 56 (which threads into 7) and a retaining ring 58 is forced in to hold seal 57 in place.

Between ring 58 and sleeve 52 the seal 57 is tapered as at 59 so that the fluid in recess 7 under pressure holds the seal tight around sleeve 52, thus completely isolating the windings from the fluid.

The usual pipe line 63 from cylinder 1 to the wheel brakes (not shown) is disconnected from the cylinder 1 and connected to the distributor 25 (see Fig. 10).

*Operation*

Assume the brakes to be off: the parts of the attachment will be in the position shown in Fig. 2. Now when the brake rod 2 is forced in (by pressure on the brake pedal, not shown, which is connected to rod 2) the liquid in the system will flow from cylinder 1 via passage 62 in bolt 3 into the lower part of passage 10; from here it will flow over valve 31 through web opening 14, through valve holes 41 into the upper part of passage 10, thence through grooves 9 to recess 7 and out via ducts 30, 29, to pipe 63 and brake-shoes-applying cylinders (not shown) to set the brakes.

The operator then closes the electric circuit (not shown) which energizes coil 55, which thereupon draws up core 36 and raises valve 31 into passage 14 until the core top engages the bottom of the lug 53, at which time 31 will engage valve seat 40. Valve seat 40 is lightly held down by spring 42 and thus covers grooves 15 against back flow of fluid. The circuit remaining closed, when the operator releases pressure on the brake pedal, pressure in the lower chamber (below web 13) is reduced, while pressure in the chamber above web 13 will remain, since valve seat 40 then acts in cooperation with valve 31 to prevent return flow of fluid.

If a partial application of the brakes has been made and magnet coil 5—5 remains energized, a further pressure on the brake pedal will cause fluid to pass upwardly through by-pass grooves 15, lifting valve seat 40 and flowing through holes 41 to give the additional pressure required further to apply the brakes.

To release the applied brakes, with foot off the brake pedal, the operator only has to open the coil's circuit again, whereupon the electromagnet becomes de-energized and gravity, assisted by the higher pressure in the upper chamber of cylinder 6, causes core 36 and valve 31 to drop from the position of Fig. 1 (energized) to that of Fig. 2 (de-energized). While the spring 42 continuously tends to keep valve seat 40 seated (Figs. 1 and 2), the openings 41 allow the return flow of liquid and the consequent release of the brakes.

It should be understood that the spring 42 is preferably a very light spring of only sufficient force to overcome any friction between valve seat 40 and the wall of the chamber or passage in which the seat 40 is located. In fact, the spring 42 may be omitted without rendering the device inoperative as the back pressure will ordinarily be sufficient to bring member 40 against web 13 when the brake pedal is released. The presence of the spring 42, however, renders the action of locking the brakes smoother and without lost motion.

It should further be noted that the member 40 does not merely act as a seat with which the upper face of valve 31 engages but also, in cooperation with valve 31 (which then acts as a seat for member 40), serves as a check valve against return flow of fluid while magnet 55 is energized.

Furthermore, since member 40 is flexible, elastic or yieldable, it allows for slight irregularities in machining or assembling the parts 53 and 31 to 36. If when the upper face of valve 31 is brought into contact with seat 40 before contact occurs between core 36 and lug 53, seat 40 will yield enough for contact to be made between members 36 and 34, even though at the time no pressure is being applied to effect an application of the brakes.

By virtue of the construction herein described and shown in the accompanying drawings, I am able to accomplish the desired results (even though the pressure in the brake lines and valves should—as it often does—reach 600 pounds per square inch) with a magnet that uses only about 2 to 2½ amperes at 6 to 8 volts.

Prior to the invention set forth in my application aforesaid, in all hydraulic brake systems now on the market with which I am familiar, it has been vitally necessary to see that no air shall be allowed to become trapped in the oil lines and operating cylinder, but with my invention I am enabled to provide an air cushion for the incompressible motive fluid; by virtue of this air cushion a softer application of the brakes to avoid wheel-locking can be obtained and danger of injury to passengers by sudden stops is reduced to a minimum.

This air cushion is caused by the air trapped in the core ducts 37—38 and sleeve 52.

By making the distributor 25 adjustable on its axis, threaded socket 28 may be made to line up conveniently with the direction of pipe 63 (Fig. 1), regardless of its position around said axis, and while I have shown only one duct 30 between ring groove 27 and upper chamber 7, it is obvious that more than one such duct may be employed if found desirable. If several ducts 30 are used they can be made of smaller bores than when only one duct is employed.

From the foregoing description, taken with the accompanying drawings, it is thought that the construction, operation and advantages of the invention will be clear to those skilled in the art and I desire it to be understood that changes in the details of construction to adapt the invention to different hydraulic brake systems may be made within the scope of the invention and the appended claims.

What I claim is:

1. In hydraulic brake apparatus which includes a brake-applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valved passage between said chambers, a solenoidal magnet including a case secured to said second mentioned cylinder, an energizing coil in said case, a core floating in said coil, a plug valve having a stem rigidly secured to said core in a position such that when said coil is energized and said core is seated in contact with said case to close the magnetic circuit, said valve will close said passage, and when the coil is not energized the core will drop to open said passage, said passage having a web with a seat for said valve and having by-pass grooves to permit fluid to pass when the plug valve is in the passage-closing position, and a flexible member for seating on said web and on said plug valve when in its passage-closing position for cooperation with said plug valve to close said by-pass against return flow of fluid while said coil is energized.

2. In a hydraulic brake system, means to hold the applied brakes set, said means including a cylinder having a longitudinal passage closed at one end and divided into an upper and a lower chamber by a web having a cylindrical opening and by-pass openings, a yieldable member held on said web and overlapping in part said cylindrical opening, spring means mounted in said longitudinal passage and continuously tending to seat said member, said member having an opening of less area than that of said cylindrical opening, means to conduct brake fluid into said lower chamber, means to deliver the same from said upper chamber, a solenoid magnet mounted on said cylinder and a core cooperating with said magnet, said core projecting into said longitudinal passage, and a cylindrical plug valve carried by said core and having a stem passing through the opening in said yieldable member and in said web, said core and said plug valve being movable as a unit and being constructed so that when said magnet is energized said plug valve will fill the cylindrical opening in said web and engage said yieldable member, said member acting in cooperation with said plug valve and said web as a back check valve.

3. In hydraulic brake apparatus which includes a brake-applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valved passage between said chambers, electro-magnetic means under control of the operator for actuating the valve in said passage to close the same, said electro-magnetic means including a case of magnetic material having a bottom and an annular side wall, a cover for the top of said case, said case having a hole in its bottom, a core-guide sleeve secured to said top and projecting through said hole, an energizing coil in said base, an operating core in said sleeve, and means to seal the case against passage of fluid into the coil chamber, said means to seal including an annular flange on the case surrounding and spaced from said sleeve, and a tapered elastic seal held in the space between said flange and said sleeve with the tapered end directed toward the outer end of the sleeve.

4. In hydraulic brake apparatus which includes a brake-applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valved passage between said chambers, electro-magnetic means under control of the operator for actuating the valve in said passage to close the same, said electro-magnetic means including a case having a bottom and an annular side wall, a cover for the top of said case, said case having a hole in its bottom, a core-guide sleeve secured to said top and projecting through said hole, an energizing coil in said case, an operating core in said sleeve, and means to seal the case against passage of fluid into the coil chamber, said means to seal including an annular flange on the case surrounding and spaced from said sleeve, and a tapered elastic seal held in the space between said flange and said sleeve with the tapered end directed toward the outer end of the sleeve, said cover having a lug surrounded by a groove, said sleeve fitting said lug with retaining friction and a ring in said groove shrunk over said sleeve around said lug.

5. In hydraulic brake apparatus which includes a brake-applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valved passage between said chambers, electro-magnetic means under control of the operator for actuating the valve in said passage to close the same, said electro-magnetic means including a case of magnetic material having a bottom and an annular side wall, a cover for the top of said case, said case having a hole in its bottom, a core-guide sleeve secured to said top and projecting through said hole, an energizing coil in said case, an operating core in said sleeve, means to seal the case against passage of fluid into the coil chamber, said means to seal including an annular flange on the case surrounding and spaced from said sleeve, and a tapered elastic seal held in the space between said flange and said sleeve with the tapered end directed toward the outer end of the sleeve, said case comprising an outer cast iron shell and an inner steel liner for said shell.

6. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valved passage between said chambers, electro-magnetic means under control of the operator for actuating the valve in said passage to close the same, said electro-magnetic means including a case having a bottom and an annular side wall, a cover for the top of said case, said case having a hole in its bottom, a core-guide sleeve secured to said top and projecting through said hole, an energizing coil on said case, an operating core in said sleeve, and means to seal the case against passage of fluid into the coil chamber, said means to seal including an annular flange on the case surrounding and spaced from said sleeve, and a tapered elastic seal held in the space between said flange and said sleeve with the tapered end directed toward the outer end of the sleeve, said cover having a lug surrounded by a groove, said sleeve fitting said lug with retaining friction and a ring in said groove shrunk over said sleeve around said lug, said case comprising an outer cast iron shell and an inner steel liner for said shell.

7. In hydraulic brake apparatus which includes a brake-applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valved passage between said chambers, electro-magnetic means under control of the operator for actuating the valve in said passage to close the same, said electro-magnetic means including a case having a bottom and an annular side wall, a cover for the top of said case, said case having a hole in its bottom, a core-guide sleeve secured to said top and projecting through said hole, an energizing coil on said case, an operating core in said sleeve, means to seal the case against passage of fluid into the coil chamber, said means to seal including an annular flange on the case surrounding and spaced from said sleeve, and a tapered elastic seal held in the space between said flange and said sleeve with the tapered end directed toward the outer end of the sleeve, said case comprising two shells in contact, one shell, at least, being a die casting and one shell, at least, being of magnetic material.

8. In apparatus of the class described, a cylinder having a longitudinal passage with an apertured web dividing the passage into a lower chamber and an upper chamber, an electro-magnetically controlled valve operating in said passage in cooperation with said web to govern the flow of liquid through said passage, means to admit liquid into said lower chamber and deliver liquid from said upper chamber, said means including a distributor having a bolt hole, a neck with an annular groove and a discharge duct leading from said groove to the outside of said distributor, said cylinder having a bolt hole intersecting the lower chamber, a bolt passing through said bolt holes, said bolt having a head, means to seal said head to said cylinder and means to seal said distributor to said cylinder when said bolt is screwed into a supporting body, said distributor being rotatably adjustable on said bolt, said bolt having a duct to deliver liquid into said lower chamber, said cylinder having a duct from said upper chamber to said distributor.

9. In apparatus of the class described, a cylinder having a longitudinal passage with an apertured web dividing the passage into a lower chamber and an upper chamber, an electro-magnetically controlled valve operating in said passage in cooperation with said web to govern the flow of liquid through said passage, means to admit liquid into said lower chamber and deliver liquid from said upper chamber, said means including a distributor having a bolt hole, a neck with an annular groove and a discharge duct leading from said groove to the outside of said distributor, said cylinder having a bolt hole intersecting the lower chamber, a bolt passing through said bolt holes, said bolt having a head, means to seal said head to said cylinder and means to seal said distributor to said cylinder when said bolt is screwed into a supporting body, said distributor being rotatably adjustable on said bolt, said bolt having a duct to deliver liquid into said lower chamber, said cylinder having a duct from said upper chamber to said distributor, said bolt having an annular collar and said cylinder having recesses one to receive said collar and one to receive said distributor's neck.

10. In a hydraulic brake system, means to hold the applied brakes set, said means including a cylinder having a longitudinal passage closed at one end and divided into an upper and a lower chamber by a web having a main opening and by-pass openings, a disc valve seat held on said web and overlapping in part said main opening, spring means mounted in said longitudinal passage and continuously tending to seat said valve seat on said web, said valve having an opening of less area than that of said web opening, means to conduct brake fluid into said lower chamber, means to deliver the same from said upper chamber, a solenoidal magnet mounted on said cylinder and a core cooperating with said magnet, said core projecting into said longitudinal passage, and a plug valve shaped to fit in said opening and carried by said core and having a stem passing through the opening in said disc valve seat and in said web, said core and said plug valve being movable as a unit and being constructed so that when said magnet is energized said plug valve will fill the main opening in said web and engage said disc valve seat, said disc valve seat acting in cooperation with said plug valve as a back check valve when the magnet is energized.

11. In a hydraulic brake system, means to hold the applied brakes set, said means including a cylinder having a longitudinal passage closed at one end and divided into an upper and a lower chamber by a web having a main opening and by-pass openings, means to conduct brake fluid into said lower chamber, means to deliver brake fluid from said upper chamber, a flexible disc having a fluid passage and being held yieldably on said web and overlapping in part said main opening, a solenoid magnet mounted on said cylinder, and a core cooperating with said magnet and projecting into said longitudinal passage and provided with a valve to fit within said main opening as a closure therefor, said core and valve being movable as a unit, said disc being constructed to yield sufficiently when contacted by said plug valve to allow said core to be fully seated before the return load of the brake fluid begins to function.

12. In a hydraulic brake system, means to hold the applied brakes set, said means including a cylinder having a passage closed at one end and divided into an upper chamber and a lower chamber by a partition having a main fluid passage and by-passages, means to introduce brake fluid into the lower chamber and to conduct the same from said upper chamber, a solenoid magnet including a case and a coil within the case and a cover for the case, a core, said cover being adapted to cooperate with said core in closing the magnetic circuit when said coil is energized, means to energize said coil when desired, a plug valve carried by said core to fit said main fluid passage as a closure for the same when said coil is energized and said core is seated against said cover, a flexible disc having a fluid passage and being located in said upper chamber for resting on said partition and projecting over said by-passages and in part over said plug valve, said disc being adapted to yield sufficiently when engaged by said plug valve to permit said core to become fully seated to close the magnetic circuit before back pressure occurs in the brake fluid and after said coil has been energized, said disc being free to leave said plug valve and said partition under brake-applying pressure to open communication between said lower and upper chambers via said by-passages.

13. In a hydraulic brake system, means to hold the applied brakes set, said means including a cylinder having a longitudinal passage closed at one end and divided into an upper and a lower chamber by a web having a main opening and by-pass openings, means to conduct brake fluid into said lower chamber, means to deliver brake fluid from said upper chamber, a flexible disc having a fluid passage and being held yieldably on said web and overlapping in part said main opening, a solenoid magnet mounted on said cylinder, a core cooperating with said magnet and projecting into said longitudinal passage and provided with a valve to fit within said main opening as a closure therefor, said core and valve being movable as a unit, said disc being constructed to yield sufficiently when contacted by said plug valve to allow said core to be fully seated before the return load of the brake fluid begins to function, and an air-spring in communication with said upper chamber and the fluid therein.

14. In hydraulic brake apparatus which includes a brake-applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said brake-applying cylinder, a normally open valve passage between said chambers, electro-magnetic means under control of the operator for actuating the valve in said passage to close the same, said electro-magnetic means including a case of magnetic material having a bottom and an annular side wall, a cover for the top of said case, said case having a hole in its bottom, a core-guide sleeve secured to said top and projecting through said hole, an energizing coil in said case, an operating core in said sleeve, means to seal the case against passage of fluid into the coil chamber, said means to seal including an annular flange on the case surrounding and spaced from said sleeve, a tapered elastic seal held in the space between said flange and said sleeve with the tapered end directed toward the outer end of the sleeve, and an air-spring in communication with said upper chamber and the fluid therein.

FRANK L. DARLING.